United States Patent
Wiesner

[15] 3,663,912
[45] May 16, 1972

[54] CORE ARRANGEMENT HAVING SLOTTED LAMINATIONS

[72] Inventor: Ernst Wiesner, Dornbirn, Austria
[73] Assignee: Walter Zumtobel, Dornbirn, Austria
[22] Filed: Dec. 2, 1970
[21] Appl. No.: 94,226

[30] Foreign Application Priority Data
Dec. 10, 1969 Austria ............................. 476

[52] U.S. Cl. ................................. 336/178, 336/212
[51] Int. Cl. .......................................... H01f 17/06
[58] Field of Search .................... 336/212, 178, 165

[56] References Cited
UNITED STATES PATENTS
1,318,787 10/1919 Mollerhoi .......................... 336/178
2,653,280 9/1953 Kiltie ............................. 336/178 X
2,802,981 8/1957 Hobart et al. ................... 336/165 X FOREIGN PATENTS OR APPLICATIONS
898,608 12/1953 Germany ........................... 336/165

Primary Examiner—Thomas J. Kozma
Attorney—Kelman & Berman

[57] ABSTRACT

The core laminations of an inductor or transformer are slotted at an angle of 45° to the direction of magnetic flux, the ends of the slots being spaced from edges of the laminations extending in that direction. When two slots are provided, they form a chevron pattern symmetrical relative to a plane extending in that direction, and the laminations may be split in that plane. The slots are wider than the laminations are thick and have approximately circularly enlarged ends.

9 Claims, 4 Drawing Figures

INVENTOR.
Ernst Wiesner
BY: Kelman and Berman
AGENTS

CORE ARRANGEMENT HAVING SLOTTED LAMINATIONS

This invention relates to iron-cored inductors and transformers, and particularly to core arrangements for an inductor or transformer.

It is known to interrupt the path of magnetic flux in the ferrous core and yoke of an inductor or transformer by an air gap constituted by slots in at least some laminations which form the path, and more specifically in the core portion of the ferromagnetic structure. To make assembly of such slotted laminations practical, the slots extend transversely of the magnetic flux over only a part of the lamination so that the longitudinal end portions of the slot are spacedly adjacent respective edges of the lamination which extend in the direction of the path. The known slots are elongated at right angles to the magnetic path.

While the integral edge portions prevent the known slotted laminations from falling apart along the slots, the laminations are sufficiently weakened by the slots to require extreme care in handling. It is difficult to wind a coil on a stack of such laminations by means of the usual automatic winding machines. The laminations tend to break while the wire is being wound on the stack.

It has now been found that the mechanical strength of the lamination can be increased significantly by making the slot oblique to the direction of the magnetic path and of the two lamination edges which are spacedly adjacent the longitudinal ends of the slot. The weakest parts of a slotted lamination have been found to be the bridges of metal in the edge portions adjacent the ends of the slots, and the improvement achieved in the laminations of the invention is due largely to the fact that the two weak spots are offset in the direction of the magnetic flux, and are thus not simultaneously stressed by a tight loop of wire being wound on the core. Under otherwise identical conditions, the metal bridges can be made narrower in the laminations of the invention than in conventional slotted laminations, thereby providing greater latitude of design as may be required for desired electrical characteristics of the inductor or transformer.

Other features, additional objects, and many of the attendant advantages of this invention will readily be appreciated as the same becomes better understood from the following detailed description of preferred embodiments when considered in connection with the appended drawing in which.

Figure 1:
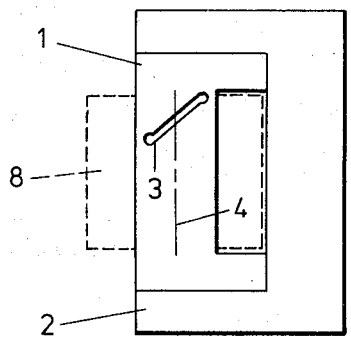
FIG.1 shows a core arrangement of the invention for a choke in section in a plane of magnetic flux.

Referring now to the drawing in detail, and initially to FIG.1, there is seen a core arrangement of the invention for an iron-cored choke. It consists of a stack of core laminations 1 and a stack of yoke laminations 2, only one lamination of each stack being visible. The laminations are about 0.5 mm thick and their other dimensions are so much greater that the laminations may be considered essentially two-dimensional for the purpose of this discussion.

The laminations 1,2 are U-shaped, and the leg portions of the yoke lamination 2 are dimensioned and arranged to receive the core laminations in a rectangular assembly defining a closed, central winding space for a portion of a coil 8 wound about the stack of core laminations 1 and shown in phantom view only. A slot 3 in the core lamination 1 is elongated at an angle of approximately 45° to a plane 4 parallel to and equidistant from two parallel edges of the lamination 1 which bound winding spaces for the winding 8 and extend in the direction of magnetic flux.

Figure 3:
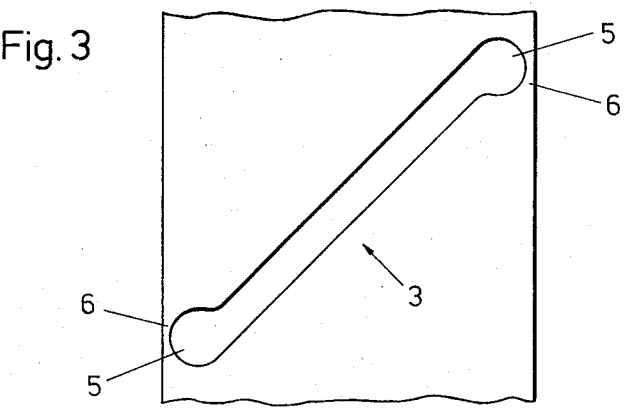
FIG.3 is an enlarged fragmentary view of a feature common to FIGS.1 and 2.

As is better seen in FIG.3, the main, central portion of the slot 3 has parallel walls and the two end portions 5 are approximately circularly enlarged adjacent the integral edge portions 6 of the lamination which connect the two parts of the lamination otherwise separated by the slot 3. The width of the slot 3, even in the relatively narrow central portion, is greater than the thickness of the lamination.

Other core laminations 1, though not necessarily all of them, are slotted in the same manner as shown in FIGS.1 and 3, and the slots are preferably aligned at right angles to the plane of the drawing. It is also preferred to arrange the slots 3 in the illustrated manner so that one of the enlarged end portions 5 is closely adjacent one of the leg parts of the U-shaped core lamination 1, but the slot 3 generally is coextensive in the direction of magnetic flux with the edge of the lamination 1 which bounds the winding space for the winding 8.

The oblique arrangement of the slot 3 not only causes less weakening of the lamination 1 than a slot perpendicular to the plane 4, but it also is punched out more conveniently than a perpendicular slot because of its greater length and the corresponding greater length of the punch employed in forming it. Very small punches wear much more rapidly than larger ones under otherwise comparable conditions. Also, tolerances are less critical in a longer slot than a shorter one. An angle of 45° between the slot 3 and the plane 4 or the direction of magnetic flux provides the best combination of mechanical and magnetic properties in the core lamination 1.

The oblique slot 3 tends to deflect the magnetic flux laterally, and it is therefore preferred to provide two slots, each closely similar to the slot 3 illustrated in FIGS.1 and 3, arranged in a chevron pattern symmetrical to the median plane of the core lamination. When the core lamination is split in a line extending in the direction of magnetic flux and coinciding with the median plane, the two parts may be made on the same set of punches.

Figure 2:
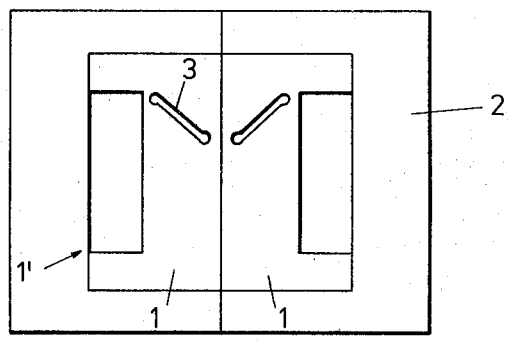
FIG.2 illustrates a modified core arrangement in a view corresponding to FIG.1.

FIG.2 illustrates such a core arrangement which entirely envelops the windings, not themselves seen in FIG.2. Two stacks of yoke laminations 2, identical with the one seen in FIG.1, are arranged in abutting engagement of the transverse terminal faces on their leg portions so as to frame a passage of square section. The stack of core laminations 1' arranged in the passage is assembled from paired elements identical with the lamination 1 shown in FIG.1 abuttingly engaged in an H pattern symmetrically relative to the plane of abutment which is also a plane of symmetry of the split lamination 1'. The two slots 3 respectively provided in the elements 1 are arranged symmetrically relative to the plane of abutment which extends in the direction of the path of magnetic flux and is equidistant from the two parallel edges of the lamination 1' on respective elements 1 respectively bounding winding spaces for the non-illustrated inductor or transformer winding.

Figure 4:
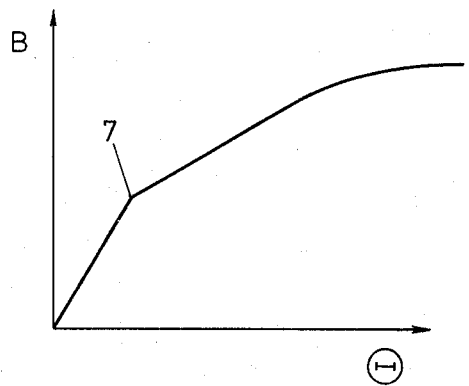
FIG.4 is a diagram of the relationship between magnetic excitation and induction in a choke of the type shown in FIGS. 1 to 3.

An inductor or transformer equipped with slotted core laminations according to the invention has a point of discontinuity in its characteristic curve at which the direction of the curve changes abruptly. A typical curve is shown in the graph of FIG.4 in which the abscissa indicates the magnitude of magnetic excitation, the ordinate indicates the magnitude of the induction B, and the curve is discontinuous at the point 7. Such a shape of the characteristic curve is advantageous and desirable for many applications.

The abruptness of the direction change is closely related to the precision with which the conditions of magnetic flux are defined at the ends of the air gap, that is, at the points where the slots 3 are bridged or shunted by the ferromagnetic edge portions 6. The enlarged end portions 5 of the slots 3, because of their arcuate contour, make it convenient to obtain precisely reproducible conditions in the critical zone by simple punching of the laminations on a press.

As is apparent from joint consideration of FIGS.1 and 2, a core arrangement of the type shown in FIG.1 may be provided with two slots 3 in its core lamination 1 symmetrical relative to the plane 4 in a chevron arrangement as illustrated in FIG.2, but without splitting the lamination. Conversely, the core lamination 1' shown in FIG.2 may be a unitary piece of metal provided with a single oblique slot, although the arrangement shown is preferred because of its effectiveness and simplicity.

The slots 3 need not necessarily be provided in the core portion of the arrangement. Other permutations and variations will readily suggest themselves to those skilled in the art.

It should be understood, therefore, that the foregoing disclosure relates only to preferred embodiments of the invention, and that it is intended to cover all changes and modifications of the examples of the invention chosen for the purpose of the disclosure which do not depart from the scope and spirit of the invention set forth in the appended claims.

What is claimed is:

1. A core arrangement for an inductor or transformer comprising a core portion and a yoke portion jointly constituting a path for magnetic flux in said inductor or transformer, a winding about said core portion, one of said portions including a plurality of stacked lamination members, each member having two transversely spaced edges extending in the direction of said path in the member and being formed with a first elongated slot transverse to said direction, said slot having two longitudinal end portions respectively spacedly adjacent said edges, the direction of elongation of said slot being obliquely inclined relative to the direction of said path, said member being formed with another slot interposed between said first-mentioned slot and one of said edges, said slots being symmetrical relative to a plane extending in the direction of said path and intersecting said member.

2. In an arrangement as set forth in claim 1, said directions enclosing an angle of about 45°.

3. In an arrangement as set forth in claim 1, said plane being substantially equidistant from said edges.

4. In an arrangement as set forth in claim 1, said member being split into two parts along a line extending in the direction of said path between said slots.

5. In an arrangement as set forth in claim 4, said line coinciding with said plane.

6. In an arrangement as set forth in claim 1, the thickness of said member at right angles to said directions being substantially smaller than the width of said first slot.

7. In an arrangement as set forth in claim 1, said end portions being enlarged relative to a central portion of said first slot connecting said end portions.

8. In an arrangement as set forth in claim 7, said end portions being of arcuate contour.

9. In an arrangement as set forth in claim 1, a portion of one of said edges being coextensive with said first slot in the direction of said path and bounding a winding space receiving said winding, said one portion being the core portion.

* * * * *